United States Patent [19]

Potter et al.

[11] Patent Number: 4,969,932

[45] Date of Patent: * Nov. 13, 1990

[54] FLYSLAG TREATMENT UTILIZING A SOLIDS-CONTAINING CONCENTRATED AQUEOUS STREAM AND A CEMENTITIOUS MATERIAL

[75] Inventors: Michael W. Potter, Sugarland; Daniel C. Baker, Houston, both of Tex.

[73] Assignee: Shell Oil Company, Houston, Tex.

[*] Notice: The portion of the term of this patent subsequent to Nov. 13, 2007 has been disclaimed.

[21] Appl. No.: 492,248

[22] Filed: Mar. 9, 1990

Related U.S. Application Data

[63] Continuation of Ser. No. 944,906, Dec. 22, 1986, abandoned.

[51] Int. Cl.$^5$ ............................ C10J 3/46; C10K 1/02
[52] U.S. Cl. .................................... 48/197 R; 48/210; 252/373
[58] Field of Search ............... 48/197 R, 210, DIG. 2; 252/373; 423/210, 215.5, 237; 106/85, 117; 186/DIG. 7

[56] References Cited

U.S. PATENT DOCUMENTS

| | | | |
|---|---|---|---|
| 3,847,566 | 11/1974 | Wilson | 48/197 R |
| 3,932,146 | 1/1976 | Wilson et al. | 252/373 |
| 3,971,639 | 7/1976 | Matthews | 252/373 |
| 4,101,332 | 7/1978 | Nicholson | 106/85 |
| 4,210,457 | 7/1980 | Dodson et al. | 106/DIG. 1 |
| 4,248,604 | 2/1981 | Woldy et al. | 252/373 |
| 4,328,011 | 5/1982 | Geidies et al. | 48/197 R |
| 4,374,672 | 2/1983 | Funston | 106/DIG. 1 |
| 4,505,881 | 3/1985 | Diaz | 423/236 |
| 4,624,837 | 11/1986 | Baker | 423/215.5 |

Primary Examiner—Peter Kratz
Attorney, Agent, or Firm—Albert J. Adamcik

[57] ABSTRACT

A process for the treatment of flyslag from the gasification of coal is described, the process being characterized, in one embodiment, by mixing of the flyslag with a cementitious material and a residual waste stream from a coal gasification process, the waste stream containing particulate flyslag solids. A composition comprising flyslag and a cementitious material, in specified proportions is also disclosed.

9 Claims, 1 Drawing Sheet

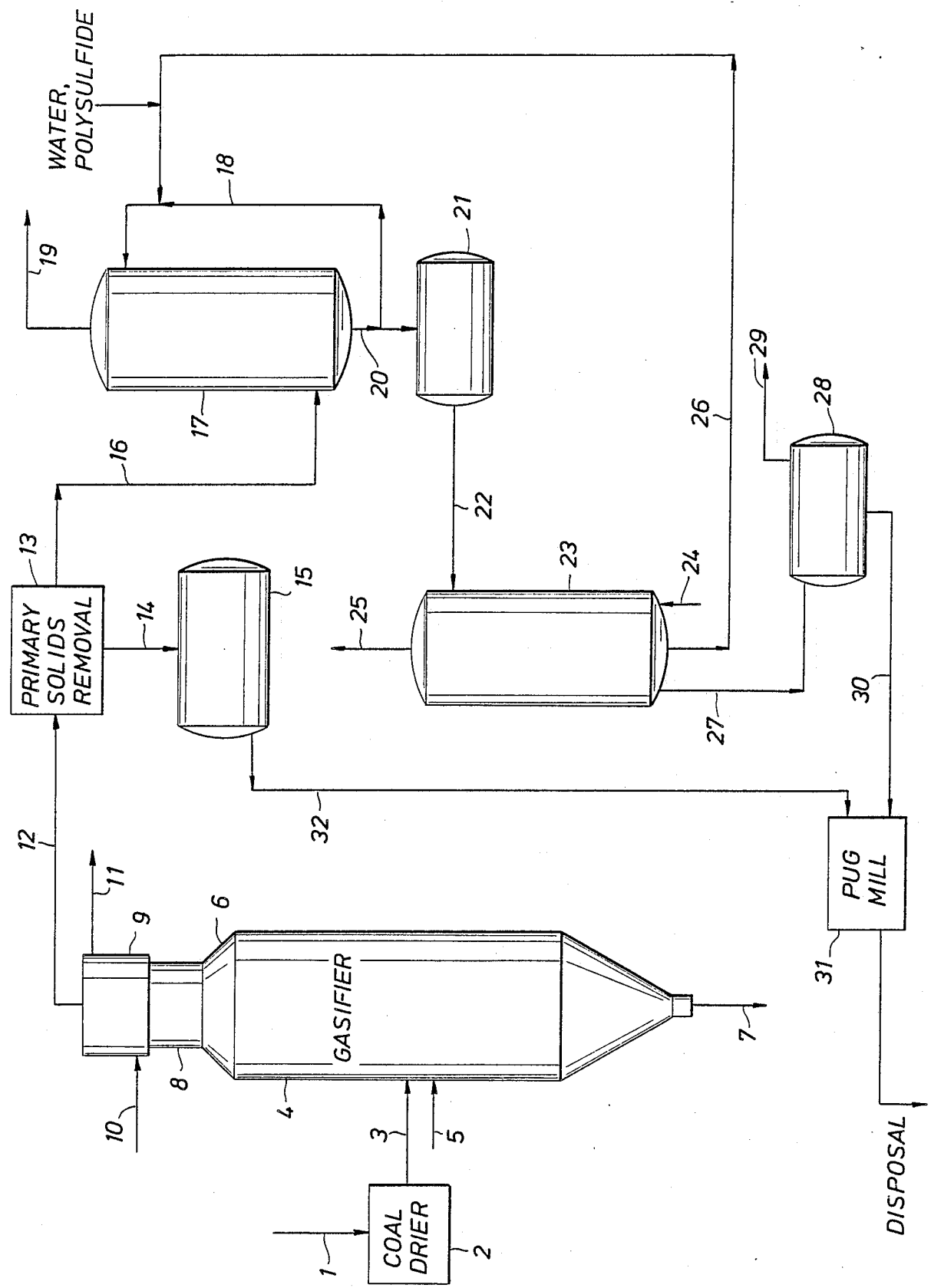

FLYSLAG TREATMENT UTILIZING A SOLIDS-CONTAINING CONCENTRATED AQUEOUS STREAM AND A CEMENTITIOUS MATERIAL

This is a continuation of application Ser. No. 944,906, filed Dec. 22, 1986 and now abandoned.

BACKGROUND OF THE INVENTION

Partial combustion or gasification of coal involves reacting the coal at elevated temperatures and possibly elevated pressures with a limited volume of oxygen, the reaction preferably being carried out in the presence of additional agents such as steam, carbon dioxide, or various other materials. Gasification of coal produces a gas, known as synthesis gas, that contains mostly carbon monoxide and hydrogen. Also produced are varying quantities of other gases, such as carbon dioxide and methane, and various liquid and solid materials, such as small particles of ash and carbon commonly known and collectively defined herein as flyslag or flyash. This flyslag, because it is derived from a "reducing" atmosphere, tends to be different in composition and properties from flyash normally associated with combustion boilers where a fully oxidizing atmosphere is utilized. For example, the flyslag from processes for partial combustion of coal may contain elemental iron, sulphides and deposited carbon, components not normally associated with boiler flyash. In general, the flyslag or flyash entrained with the gas in partial combustion processes is usually removed from the raw synthesis gas by a combination of cyclones or separators, or a water scrubbing system employing washer coolers, venturi scrubbers, or filters or electrostatic precipitators, or combinations of these systems.

The raw synthesis gas from the gasifier or gasification zone contains, in addition to the aforementioned materials, sulfur-containing gases, such as hydrogen sulfide and carbonyl sulfide, as well as small amounts of ammonia and hydrogen cyanide. The presence of HCN, $NH_3$, and COS in synthesis gas derived from the gasification of coal complicates removal of additional impurities such as $H_2S$ and/or $CO_2$, and poses problems insofar as product quality and pollution control requirements are concerned. Although HCN, $NH_3$, and COS are present, as indicated, in quite minor quantities, for example, normally less than 1 percent by volume, combined, of the total raw synthesis gas stream, they must be dealt with before the synthesis gas is utilized.

The flyslag or flyash removed from the synthesis gas may have undesirable properties insofar as its ultimate disposal is concerned. For example, it may be light, friable, dusty, and difficult to compact. Because it may contain unsuitable species such as arsenic, selenium, and sulfides, it must be handled with care, and, if it is to be utilized or disposed of as land fill, must be in a form which does not release such materials readily to the environment. The invention addresses the problems of flyslag treatment, concomitantly accomplishing the treatment and utilization of other nominal waste products from the gasification process.

SUMMARY OF THE INVENTION

Accordingly, in one embodiment, the invention relates to process for removing flyslag from a synthesis gas stream from which the bulk of the flyslag has already been removed comprising (a) passing said gas stream to a scrubbing zone which includes or comprises a loaded scrubbing solution stripping section, and scrubbing said gas stream with an effective amount of an aqueous scrubbing solution, and removing remaining flyslag particles and HCN, $NH_3$, and COS from said gas stream, producing a partially purified gas stream substantially free of flyslag, and an aqueous stream containing flyslag particles from said stripping section, and passing said aqueous stream to a concentrating zone;

(b) removing from said concentrating zone a concentrated aqueous stream derived from said aqueous stream and having a ratio of flyslag particulate solids to liquid greater than that of the aqueous stream entering said concentrating zone;

(c) mixing a major portion of flyslag and a minor portion of cementitious material with at least a portion of the concentrated aqueous stream from step (b), the concentrated aqueous stream being supplied in a ratio of from about one part to about five parts concentrated aqueous stream per part, by weight, combined total solids of flyslag and cementitious material, and producing a solid flyslag composite having improved disposal properties.

In another embodiment, the invention relates to a process in which a gas stream containing flyslag, derived from the gasification of coal, is treated by (a) passing said gas stream containing flyslag to a solids separation zone, and separating the bulk of the flyslag in said zone, producing solid flyslag and a gas stream having reduced flyslag content;

(b) passing gas stream having reduced flyslag content from step (a) to a scrubbing zone which includes a loaded scrubbing solution stripping section, and scrubbing said gas stream with an effective amount of an aqueous scrubbing solution, and removing HCN, $NH_3$, and COS and remaining flyslag particles from said gas stream, producing a partially purified gas stream substantially free of flyslag, and an aqueous stream containing flyslag particles from said stripping section, and passing said aqueous stream to a concentrating zone;

(c) removing from said concentrating zone a concentrated aqueous stream derived from said aqueous stream and having a ratio of flyslag particulate solids to liquid greater than that of the aqueous stream entering said concentrating zone;

(d) mixing a major portion of flyslag from step (a) and a minor portion of cementitious material with at least a portion of the concentrated stream from step (c), the concentrated aqueous stream being supplied in a ratio of from about one part to about five parts concentrated aqueous stream per part, by weight, combined total solids of flyslag and cementitious material, and producing a solid flyslag composite having improved disposal properties.

In yet another embodiment, the invention relates to a process for the gasification of coal comprising (a) partially combusting particulate coal in a gasification zone comprising at least one gasification reactor, and producing a hot gaseous stream containing synthesis gas, flyslag, and minor amounts of HCN, $NH_3$, and COS;

(b) quenching and cooling said hot gaseous stream, and removing at least the bulk of the flyslag therefrom, producing a cool gaseous stream having reduced flyslag content;

(c) passing cool gas stream having reduced flyslag content from step (b) to a scrubbing zone which includes a loaded scrubbing solution stripping section and scrubbing said gaseous stream with an effective amount of an aqueous scrubbing solution, and removing HCN, NH₃, and COS and remaining flyash particles from said gas stream, producing a partially purified gas stream substantially free of flyslag, and an aqueous stream containing flyslag particles from said stripping section, and passing said aqueous stream to a concentrating zone;

(d) removing from said concentrating zone a concentrated aqueous stream derived from said aqueous stream and having a ratio of flyslag particulate solids to liquid greater than that of the aqueous stream entering said concentrating zone;

(e) mixing a major portion of flyslag derived from at least one gasification reactor of step (a) and a minor portion of cementitious material with at least a portion of the concentrated stream from step (d), the concentrated aqueous stream being supplied in a ratio of from about one part to about five parts concentrated aqueous stream per part, by weight, combined total solids of flyslag and cementitious material, and producing a solid flyslag composite having improved disposal properties.

In a separate embodiment, the invention relates to a readily disposable flyslag composite formed by mixing a major portion of flyslag, a minor portion of cementitious material, and water, the water being applied in a ratio of from about one part to about five parts water per part, by weight, combined total solids of flyslag and cementitious material. Preferably, the flyslag composite may be formed by mixing the flyslag and water, then adding the cementitious material, in the proportions mentioned. The water and cementitious material may also be mixed and then the flyslag added, in the proportions mentioned, but this is not preferred. As used herein, the term "cementitious material" refers to compositions comprising alumina, silica, lime, iron oxide and magnesia burned together in a kiln and finely pulverized, which, when mixed with water to form a plastic mass, hardens by chemical combination and by gelation and crystallization. Suitable examples of such material include, but are not limited to, portland cement, alumina cement, and natural cement. The term "water" is generally taken to mean any source of water, including pure water and "impure" water from a variety of sources, and thus will include water containing impurities, both liquid, solid, and gaseous. For example, the water employed may be a concentrated waste slurry stream, as described herein, and may include, but is not limited to, effluent streams, waste streams, blowdown, etc. Those skilled in the art will recognize that the only significant limitation is that the concentrations or character of any extraneous components of the "water" do not interfere to any substantial extent with the aggregation or formation of the composites or desired properties of such composites described herein, or do not pose significant environmental problems themselves.

DETAILED DESCRIPTION OF THE INVENTION

The partial combustion of coal to produce synthesis gas, which is essentially carbon monoxide and hydrogen, and particulate flyslag, is well known, and a survey of known processes is given in "Ullmanns Enzyklopadie Der Technischen Chemie", vol. 10 (1958), pp. 360-458. Several such processes for the preparation of hydrogen and carbon monoxide, flyslag-containing gases are currently being developed. Accordingly, details of the gasification process are related only insofar is as necessary for understanding of the present invention.

In general, the gasification is carried out by partially combusting the coal with a limited volume of oxygen at a temperature normally between 800° C. and 2000° C., and preferably at a temperature between 1050° C. and 2000° C. If a temperature of between 1050° C and 2000° C is employed, the product gas may contain very small amounts of gaseous side products such as tars, phenols and condensable hydrocarbons. Suitable coals include lignite, bituminous coal, sub-bituminous coal, anthracite coal, and brown coal. Lignites and bituminous coals are preferred. In order to achieve a more rapid and complete gasification, initial pulverization of the coal is preferred. Particle size is preferably selected so that 70% of the solid coal feed can pass a 200 mesh sieve. The gasification is preferably carried out in the presence of oxygen and steam, the purity of the oxygen preferably being at least 90% by volume, nitrogen, carbon dioxide, and argon being permissible as impurities. If the water content of the coal is too high, the coal should be dried before use. The atmosphere will be maintained reducing by the regulation of the weight ratio of the oxygen to moisture and ash free coal in the range of 0.6 to 1.0, preferably 0.8 to 0.9. The specific details of the equipment and procedures employed form no part of the invention, but those described in U.S. Pat. No. 4,350,103, and U.S. Pat. No. 4,458,607 both incorporated herein by reference, may be employed. Although, in general, it is preferred that the ratio between oxygen and steam be selected so that from 0.1 to 1.0 parts by volume of steam is present per part by volume of oxygen, the invention is applicable to processes having substantially different ratios of oxygen to steam. The oxygen used is preferably heated before being contacted with the coal, preferably to a temperature of from about 200° to about 500° C.

The details of the gasification reactor system form no part of the present invention, and suitable reactors are described in British Patent No. 1501284 and U.S. Pat. No. 4,022,591. The high temperature at which the gasification is carried out is obtained by reacting the coal with oxygen and steam in a reactor at high velocity. A preferred linear velocity is from 10 to 100 meters per second, although higher or lower velocities may be employed. The pressure at which the gasification can be effected may vary between wide limits, preferably being from 1 to 200 bar. Residence times may vary widely; common residence times of from 0.2 to 20 seconds are described, with residence times of from 0.5 to 15 seconds being preferred.

After the starting materials have been converted, the reaction product, which comprises hydrogen, carbon monoxide, carbon dioxide, and water, as well as the aforementioned impurities, is removed from the reactor. This gas, which normally has a temperature between 1050° C. and 1800° C., contains the impurities mentioned and flyslag, including carbon-containing solids. In order to permit removal of these materials and impurities from the gas, the reaction product stream should be first be cooled. A variety of elaborate techniques have been developed for cooling the gaseous stream, the techniques in general being characterized by use of a boiler in which steam is generated with the aid of the waste heat. Cyclones or other suitable techniques may be provided for removing particulate solids from the gaseous stream. Even though such procedures may be practiced, further reduction of the solids content may nevertheless be desirable. To this end, the gas stream is preferably passed through a scrubbing zone, where it is washed with an aqueous scrubbing solution. The scrubbing zone may comprise one or more scrubbing sections or "scrubbers". The term "aqueous scrubbing solution", as used herein, includes, but is not limited to, water, various process streams, and solution from which the HCN, $NH_3$ and COS have been stripped, i.e., recycle, as well as solution treated by hydrolysis, as further hereinafter described. As used herein, the term "loaded" merely indicates that the scrubbing solution or solutions, after scrubbing the gaseous stream, contain finite quantities of one or more of the impurity gases mentioned and particulate flyslag solids. The aqueous scrubbing solution may contain materials, such as selective amines, to assist in impurity removal, and caustic may be added to adjust pH and optimize removal. Water is effective for HCN and $NH_3$, and amine solution may be added for COS removal, in a separate stage, if desired. If more than one stage is employed, the solutions may or may not be combined before their entry into the stripping zone. The aqueous scrubbing solution may also contain ammonium polysulfide, which reacts with the HCN in the gas stream to form ammonium thiocyanate. Depending on the type of scrubbing solution employed, different treatment of "spent" or "loaded" solution will be required. For example, if water (and recycle water) is used as the aqueous scrubbing solution, the loaded solution may be forwarded to a stripping section where the HCN and $NH_3$ may be stripped and sent for disposal. If ammonium polysulfide is employed in the aqueous scrubbing solution, the spent thiocyanate containing solution may be sent to a hydrolysis zone where the thiocyanate is hydrolyzed to produce $NH_3$, $CO_2$, and $H_2S$. In this case the solution may then be stripped in a stripping section, and the released gases are processed as desired. Suitable hydrolysis techniques are described in U.S. Pat. No. 4,497,784, U.S. Pat. No. 4,505,881, and U.S. Pat. No. 4,508,693, all to Diaz, incorporated herein by reference. What is required in several embodiments of the invention, however, is that the scrubbing zone comprise or include such a stripping section, a bleed or aqueous stream from the stripping section being employed to regulate concentration of flyslag particulates and impurities in the scrubbing zone. The aqueous stream or bleed size is not critical, but will preferably comprise from about 33 percent to 100 percent by volume of the aqueous stream or solution entering the section. Those skilled in the art may adjust the pH, composition, and volumes of aqueous scrubbing solution to supply an amount effective to remove substantially all, if not all, of the HCN, $NH_3$, COS, and flyslag from the synthesis gas stream. Suitable scrubbing apparatus has been described in U.K. Patent No. 826,209. As a result of such a washing treatment, a gas is obtained which contains hardly any solids, and which preferably has a temperature between 20° C. and 40° C.

As indicated, the invention includes the treatment of the contaminated or "loaded" scrubbing solution, with the aim of utilizing a portion thereof in an efficient manner. In one case, aqueous scrubbing solution containing dissolved HCN, $NH_3$ and COS, is fed to a stripping zone or stripper where the impurity gases are stripped from the solution. This procedure is accomplished preferably by forwarding solution from the scrubbing zone as a bleed stream therefrom, to a stripping zone wherein suitable techniques are employed to strip the impurity gases from the solution. The treatment of the hydrolysis zone effluent, in the case of polysulfide addition, has been noted, supra.

In the stripper, the scrubbing solution may be stripped by heating, contact with a nonreactive gas, or a combination of heating and gas flow stripping. The stripping produces, in one case, a gas stream containing HCN, $NH_3$, and COS, in the polysulfide case, $NH_3$, $CO_2$, and $H_2S$. The stripped solution, as indicated, contains particulate flyslag solids or fines, these fines being present from infinitesimal amounts to amounts of from about 2% by weight to about 5% by weight. This fines content determines the treatment of the solution described herein. Preferably, the bulk of the stripped solution is returned to the scrubbing zone for reuse. Caustic may be added in the stripper to assist release of $NH_3$.

Whatever the case, as indicated, the scrubbing solution may be stripped by heating, or by use of flow of a non-reactive gas (or both). If heat alone is applied to the scrubbing solution, sufficient heat will be supplied to release the dissolved gases. Generally, temperatures on the order of about 80° C. to about 150° C., preferably from about 80° C to about 120° C., will be sufficient to release the dissolved gases.

If a non-reactive stripping gas is employed, it will be supplied at a suitable pressure, for example 3 to 5 atmospheres, to strip the dissolved gases from the scrubbing solution. Any suitable stripping device may be used, such as packed column or a tray column. Different devices may be used (whether stripping is accomplished by heat, gas flow, or a combination thereof) where plugging by solids may be a problem. In any event, any suitable non-reactive gas may be employed. As used herein, the term "non-reactive" implies that the gas does not react with the scrubbing solution to any substantial extent. Suitable gases, under the conditions in the stripping zone, include air, steam, carbon dioxide, oxygen, nitrogen, and inert gases. Steam is much preferred, since it can provide heat for the stripping and may be condensed easily, leaving a relatively concentrated stream. Those skilled in the art may adjust volumes and velocities of the stripping gas to appropriate levels. As indicated, heat may be supplied in the case of a stripping gas to assist the stripping.

The stripped impurity gases are separated and removed from the scrubbing solution and, depending on their nature, for example, may be forwarded to a gasification reactor. If a multiplicity of gasification reactors is employed in the gasification zone, the impurity gases from the stripping zone may be sent to any one or all of the reactors, as desired or appropriate. If the gasification reactor is operated under high pressure, as is commonly the case, the pressure of the impurity gas stream must be increased for entry of the gases into the reactor. Suitable devices for doing so are within the skill of the art, and as such, form no part of the present invention. Alternately, the stripped gases may be sent for chemical treatment or recovery.

In accordance with the invention, a minor portion or bleed stream of the stripped solution is removed from the stripping zone, and is sent to a concentrating zone. In such zone, the minor portion or bleed stream may be treated in one or more ways to produce a concentrated aqueous stream having a ratio of particulate flyslag or flyash solids to liquid greater than that of the portion or bleed entering the concentrating zone. Thus, the portion or bleed (or a portion thereof) may be clarified or settled, or may be filtered, or subjected to any suitable combination of such treatments to produce the concentrated aqueous stream. Preferably, the mixture is first clarified, and the underflow is sent to e.g., static filters or thickeners. Preferably, the concentrated aqueous stream removed from the thickeners or filters will have a particulate flyslag or fines content of from about five or ten percent by weight to about twenty to thirty percent by weight, most preferably ten percent to twenty percent by weight, based on the weight of the stream and flyslag. Those skilled in the art will recognize that the concentrated aqueous stream also contains minor amounts, e.g., from about 0.1 to about 0.5 percent by weight, of residual impurities such as chlorides and sulfates. Clarified or filtered liquid from the concentrating zone may be utilized in the process again, if desired, or may be sent to treatment.

The concentrated aqueous stream is forwarded to a mixing zone, where it is combined, as hereinafter described, with flyslag. The source of the flyslag is not critical, but, of course, the most usual source will be the flyslag produced in a previous step of the process, or in an associated gasification process scheme if a gasification zone having a multiplicity of reactors is utilized. The flyslag may also be that from which residual carbon values have been removed, as for example, by oxidation of "ordinary" flyslag, or as described in copending application Ser. No. 813,737, entitled Flyash Process, by Hardesty, filed Dec. 27, 1985 and now abandoned, incorporated herein by reference. Again, the flyslag and cementitious material may be mixed with any appropriate aqueous stream available, water being suitable. The use of the concentrated aqueous stream accomplishes the disposal of remaining fines from the concentrating zone, at the same time disposing of some liquid effluent. If the volume of the concentrated aqueous stream is insufficient to produce the type of product desired, water from any other source may be added.

Any suitable mixing device or devices, such as a pug mill, may be utilized for the mixing. As indicated, the flyslag, the cementitious material, and the water will be mixed in the proportions mentioned to provide a mixture having the desired characteristics. Most preferably, the flyslag and cementitious material will be mixed in a ratio of from about 0.05 part to about 0.3 part cementitious material per part flyslag, by weight, water being applied in a ratio of from about one part to about five parts water per part, by weight, combined total solids of flyslag and cementitious material. Pressures in the concentrating and mixing zone are not critical and may be atmospheric or greater. Temperatures in the concentrating and mixing zone are similarly not critical, and may range from atmospheric to 150° C. or more. The conditions and proportions described will normally produce a solid mixture having reduced dusting tendencies, and which mixture is easily transported or disposed.

In order to illustrate the invention more fully, reference is made to the accompanying schematic drawing. The drawing is of the process flow type in which auxillary equipment, such as valves, pumps, holding vessels, etc., have been omitted therefrom. All values are merely exemplary or calculated.

Accordingly, pulverulent coal is passed via line (1) into a coal dryer (2) where the coal is dried, suitably at a temperature of about 200° C. The dry coal is subsequently discharged through a line (3) and passed into a gasification reactor (4) where it is gasified at a temperature of about 1500° C. to about 2000° C., a pressure of about 35 atmospheres absolute, with oxygen, which is supplied through a line (5). The gasification produces a product or synthesis gas which is removed from the upper portion (6) of the reactor, and a slag which is removed from the lower portion of the reactor via line (7). The gasification product is removed via conduit (8) where it is quenched and then passed through a boiler or heat exchange zone (9) where it is cooled to a temperature of about 200° C. In the heat exchange zone (9), water which is supplied through line (10) is converted by indirect heat exchange to high pressure steam, the steam being discharged through a line (11). The cooled gasification product is passed through a line (12) to a series of cyclones (13) where the bulk of the particulates (flyslag) is removed and sent via line (14) to storage in vessel (15). The synthesis gas then passes via line (16) to scrubber (17) where it is contacted with an aqueous scrubbing solution. Water and/or recycle scrubbing water solution are supplied to scrubber (17) through line (18). In scrubber (17) a scrubbing solution containing ammonium polysulfide converts HCN and absorbs ammonia and COS present in the gaseous stream, and removes soot and remaining flyslag therefrom. Purified synthesis gas passes from scrubber (17) through line (19) on to further treatment and/or recovery. Scrubbing water, containing dissolved gases, ammonium thiocyanate, and flyslag and soot, is removed from the lower portion of scrubber (17) and is sent by line (20) to a hydrolysis zone (21). Internal recycle for scrubber (17) is provided by line (18). Hydrolysis zone (21) comprises merely a holding vessel maintained at 250° C., and an average residence time for a given portion of solution will be from 30 minutes to one hour. Water is supplied if needed, and the ammonium thiocyanate in the mixture hydrolyzes to $NH_3$, $CO_2$, and $H_2S$. The gas-liquid mixture is forwarded via line (22) to stripping zone or column (23) where the gases are stripped from solution. Stripping zone (23) comprises a stripper contactor of the tray type, in which liquid is introduced into the top of the column and a non-reactive gas is introduced via line (24) into the bottom of the column. Preferably, steam, at a temperature of 300° F., is employed in stripping the gases, so that upon leaving column (23), through line (25), the now freed impurity gases and the steam in line (25) are suitably conveyed for chemical and/or biological treatment. Solution containing ammonium polysulfide is removed via line (26) and returned, with suitable make-up, if necessary, for use in scrubber (17). If water is the aqueous scrubbing liquid, hydrolysis zone (21) may be omitted, HCN, $NH_3$ and COS being removed from scrubber (23) via line (25). From stripper (23), a bleed stream (27), which will suitably comprise from about 33 percent to about 100 percent, preferably about 40 percent to 60 percent, by volume, of the total flow in line (22) to column (23), and containing about 3 percent by weight of flyslag and unreacted solids, is continuously removed and sent to a concentrating zone (28). Concentrating zone (28) comprises a clarifier vessel from which a clarified liquid is removed overhead via line (29) for chemical and/or biological treatment. A bottom stream containing about 15 percent by weight of flyslag and unreacted solids is removed via line (30), and is sent to a pug mill (31). In pug mill (31) flyslag from vessel (15), sent via line (32), is combined with the bottom stream and with portland cement, the concentrated bottom stream being combined with the flyslag and cement in a ratio of about 1.5 parts concentrated clarifier bottoms to one part flyslag and 0.1 part portland cement per part of flyslag. A flyslag composite is removed for utilization or disposal at the exit of the pug mill.

While the invention has been illustrated with particular apparatus, those skilled in the art will appreciate that, except where specified, other equivalent or analogous units may be employed. The term "zone", as employed in the specification and claims, includes, where suitable, the use of segmented equipment operated in series, or the division of one unit into multiple units to improve efficiency or overcome size constraints, etc. For example, a series of scrubbers might be employed, with different aqueous solutions, at least the bulk of the "loaded" solutions being sent to one or more strippers. Parallel operation of units, is, of course, well within the scope of the invention. As described, of course, if water is the scrubbing solution, the hydrolysis zone is omitted and provision is made for HCN, etc. treatment.

What is claimed is:

1. A process for removing flyslag from a synthesis gas stream from which the bulk of the flyslag has already been removed comprising
    (a) passing said gas stream to a scrubbing zone which includes a loaded scrubbing solution stripping section, and scrubbing said gas stream with an effective amount of an aqueous scrubbing solution, and removing remaining flyslag particles and HCN, $NH_3$, and COS from said gas stream, producing a partially purified gas stream substantially free of flyslag, and an aqueous stream containing flyslag particles from said stripping section, and passing said aqueous stream to a concentrating zone;
    (b) removing from said concentrating zone a concentrated aqueous stream derived from said aqueous stream and having a ratio of flyslag particulate solids to liquid greater than that of the aqueous stream entering said concentrating zone;
    (c) mixing a major portion of flyslag and a minor portion of cementitious material with at least a portion of the concentrated aqueous stream from step (b), the concentrated aqueous stream being supplied in a ratio of from about one part to about five parts concentrated aqueous stream per part, by weight, combined total solids of flyslag and cementitious material, and producing a solid flyslag composite having improved disposal properties.

2. A process for the removal of flyslag from a gas stream containing flyslag, the gas stream derived from the gasification of coal, comprising
    (a) passing said gas stream containing flyslag to a solids separation zone, and separating the bulk of the flyslag in said zone, producing solid flyslag and a gas stream having reduced flyslag content;
    (b) passing gas stream having reduced flyslag content from step (a) to a scrubbing zone which includes a loaded scrubbing solution stripping section, and scrubbing said gas stream with an effective amount of an aqueous scrubbing solution, and removing HCN, $NH_3$, and COS and remaining flyslag particles from said gas stream, producing a partially purified gas stream substantially free of flyslag, and an aqueous stream containing flyslag particles from said stripping section, and passing said aqueous stream to a concentrating zone;
    (c) removing from said concentrating zone a concentrated aqueous stream derived from said aqueous stream and having a ratio of flyslag particulate solids to liquid greater than that of the aqueous stream entering said concentrating zone;
    (d) mixing a major portion of flyslag from step (a) and a minor portion of cementitious material with at least a portion of the concentrated stream from step (c), the concentrated aqueous stream being supplied in a ratio of from about one part to about five parts concentrated aqueous stream per part combined total solids of flyslag and cementitious material, and producing a solid flyslag composite having improved disposal properties.

3. A process for the gasification of coal comprising
    (a) partially combusting particulate coal in a gasification zone comprising at least one gasification reactor, and producing a hot gaseous stream containing synthesis gas, flyslag, and minor amounts of HCN, $NH_3$, and COS;
    (b) quenching and cooling said hot gaseous stream, and removing at least the bulk of the flyslag therefrom, producing a cooled gaseous stream having reduced flyslag content;
    (c) passing cool gas stream having reduced flyslag content from step (b) to a scrubbing zone which includes a loaded scrubbing solution stripping section, and scrubbing said gaseous stream with an effective amount of an aqueous scrubbing solution, and removing HCN, $NH_3$, and COS and remaining flyslag particles from said gas stream, producing a partially purified gas stream substantially free of flyslag, and an aqueous stream containing flyslag particles from said stripping section, and passing said aqueous stream to a concentrating zone;
    (d) removing from said concentrating zone a concentrated aqueous stream derived from said aqueous stream and having a ratio of flyslag particulate solids to liquid greater than that of the aqueous stream entering said concentrating zone;
    (e) mixing a major portion of flyslag derived from at least one gasification reactor of step (a) and a minor portion of cementitious material with at least a portion of the concentrated stream from step (d), the concentrated aqueous stream being supplied in a ratio of from about one part to about five parts concentrated aqueous stream per part, by weight, combined total solids of flyslag and cementitious material, and producing a solid flyslag composite having improved disposal properties.

4. A process for removing flyslag from a synthesis gas stream from which the bulk of the flyslag has already been removed comprising
    (a) passing said gas stream to a scrubbing zone, and scrubbing said gas stream with an effective amount of an aqueous scrubbing liquid, and removing remaining flyslag particles and HCN, $NH_3$, and COS from said gas stream, producing a partially purified gas stream substantially free of flyslag and a loaded aqueous scrubbing solution;
    (b) stripping the bulk of the HCN, $NH_3$, and COS from at least a portion of said loaded solution in a stripping zone;
    (c) removing an aqueous stream containing flyslag particles from said stripping zone, and passing said aqueous stream to a concentrating zone;
    (d) removing from said concentrating zone a concentrated aqueous stream derived from said aqueous stream and having a ratio of flyslag particulate solids to liquid greater than that of the aqueous stream entering said concentrating zone;
    (e) mixing a major portion of flyslag and a minor portion of cementitious material with at least a portion of the concentrated aqueous stream from step (d), the concentrated aqueous stream being supplied in a ratio of from about one part to about five parts concentrated aqueous stream per part, by weight, combined total solids of flyslag and cementitious material, and producing a solid flyslag having improved disposal properties.

5. A process for the removal of flyslag from a gas stream containing flyslag, the gas stream derived from the gasification of coal, comprising
   (a) passing said gas stream containing flyslag to a solids separation zone, and separating the bulk of the flyslag in said zone, producing solid flyslag and a gas stream having reduced flyslag content;
   (b) passing gas stream having reduced flyslag content from step a) to a scrubbing zone, and scrubbing said gas stream with an effective amount of an aqueous scrubbing liquid, and removing HCN, $NH_3$, and COS and remaining flyslag particles from said gas stream, producing a partially purified gas stream substantially free of flyslag and a loaded aqueous scrubbing solution;
   (c) stripping the bulk of the HCN, $NH_3$, and COS from at least a portion of said loaded scrubbing solution in a stripping zone;
   (d) removing an aqueous stream containing flyslag particles from said stripping zone, and passing said aqueous stream to a concentrating zone;
   (e) removing from said concentrating zone a concentrated aqueous stream derived from said aqueous stream and having a ratio of flyslag particulate solids to liquid greater than that of the aqueous stream entering said concentrating zone;
   (f) mixing a major portion of flyslag from step (a) and a minor portion of cementitious material with at least a portion of the concentrated stream from step (e), the concentrated aqueous stream being supplied in a ratio of from about one part to about five parts concentrated aqueous stream per part, by weight, combined total solids of flyslag and cementitious material; and producing a solid flyslag composite having improved disposal properties.

6. A process for the gasification of coal comprising
   (a) partially combusting particulate coal in a gasification zone comprising at least one gasification reactor, and producing a hot gaseous stream containing synthesis gas, flyslag, and minor amounts of HCN, $NH_3$, and COS;
   (b) cooling said gaseous stream, and removing at least the bulk of the flyslag therefrom, producing a cooled gaseous stream having reduced flyslag content;
   (c) passing cool gas stream having reduced flyslag content from step b) to a scrubbing zone, and scrubbing said gaseous stream with an effective amount of an aqueous scrubbing liquid, and removing HCN, $NH_3$ and COS and remaining flyslag particles from said gas stream, producing a partially purified gas stream substantially free of flyslag and a loaded aqueous scrubbing solution;
   (d) stripping the bulk of the HCN, $NH_3$ and COS from at least a portion of said loaded scrubbing solution in a stripping zone;
   (e) removing an aqueous stream containing flyslag particles from said stripping zone, and passing said aqueous stream to a concentrating zone;
   (f) removing from said concentrating zone a concentrated aqueous stream derived from said aqueous stream and having a ratio of flyslag particulate solids to liquid greater than that of the aqueous stream entering said concentrating zone; and
   (g) mixing a major portion of flyslag derived from at least one gasification reactor of step (a) and a minor portion of cementitious material with at least a portion of the concentrated stream from step (f), the concentrated aqueous stream being supplied in a ratio of from about one part to about five parts concentrated aqueous stream per part, by weight, combined total solids of flyslag and cementitious material, and producing a solid flyslag composite having improved disposal properties.

7. A process for removing flyslag from a synthesis gas stream from which the bulk of the flyslag has already been removed comprising
   (a) passing said gas stream to a scrubbing zone, and scrubbing said gas stream with an effective amount of an aqueous scrubbing liquid containing ammonium polysulfide, and removing remaining flyslag particles and HCN, $NH_3$, and COS from said gas stream, producing a partially purified gas stream substantially free of flyslag and a loaded aqueous scrubbing solution containing ammonium thiocyanate;
   (b) hydrolzing ammonium thiocyanate in at least a portion of said loaded scrubbing solution, forming a hydrolyzed solution;
   (c) stripping $H_2S$, $NH_3$, and $CO_2$ from at least a portion of said hydrolyzed solution in a stripping zone;
   (d) removing an aqueous stream of stripped solution containing flyslag particles from said stripping zone, and passing said aqueous stream to a concentrating zone;
   (e) removing from said concentrating zone a concentrated aqueous stream derived from said aqueous stream and having a ratio of flyslag particulate solids to liquid greater than that of the aqueous stream entering said concentrating zone;
   (f) mixing a major portion of flyslag and a minor portion of cementitious material with at least a portion of the concentrated aqueous stream from step (e), the concentrated aqueous stream being supplied in a ratio of from about one part to about five parts concentrated aqueous stream per part, by weight, combined total solids of flyslag, and cementitious material, and producing a solid flyslag having improved disposal properties.

8. A process for the removal of flyslag from a gas stream containing flyslag, the gas stream derived from the gasification of coal, comprising
   (a) passing said gas stream containing flyslag to a solids separation zone, and separating the bulk of the flyslag in said zone, producing solid flyslag and a gas stream having reduced flyslag content;
   (b) passing gas stream having reduced flyslag content from step a) to a scrubbing zone, and scrubbing said gas stream with an effective amount of an aqueous scrubbing liquid containing ammonium polysulfide, and removing HCN, $NH_3$, and COS and remaining flyslag particles from said gas stream, producing a partially purified gas stream substantially free of flyslag and a loaded aqueous scrubbing solution containing ammonium thiocyanate;
   (c) hydrolyzing ammonium thiocyanate in at least a portion of said loaded scrubbing solution forming a hydrolyzed solution;

(d) stripping $H_2S$, $NH_3$, and $CO_2$ from at least a portion of said hydrolyzed solution in a stripping zone;
(e) removing an aqueous stream of stripped solution containing flyslag particles from said stripping zone, and passing said aqueous stream to a concentrating zone;
(f) removing from said concentrating zone a concentrated aqueous stream derived from said aqueous stream and having a ratio of flyslag particulate solids to liquid greater than that of the aqueous stream entering said concentrating zone;
(g) mixing a major portion of flyslag from step (a) and a minor portion of cementitious material with at least a portion of the concentrated stream from step (f), the concentrated aqueous stream being supplied in a ratio of from about one part to about five parts concentrated aqueous stream per part, by weight, combined total solids of flyslag and cementitious material, and producing a solid flyslag composite having improved disposal properties.

9. A process for the gasification of coal comprising
(a) partially combusting particulate coal in a gasification zone comprising at least one gasification reactor, and producing a hot gaseous stream containing synthesis gas, flyslag, and minor amounts of HCN, $NH_3$, and COS;
(b) cooling said gaseous stream, and removing at least the bulk of the flyslag therefrom, producing a cooled gaseous stream having reduced flyslag content;
(c) passing cool gas stream having reduced flyslag content from step b) to a scrubbing zone, and scrubbing said gaseous stream with an effective amount of an aqueous scrubbing liquid containing ammonium polysulfide, and removing HCN, $NH_3$ and COS and remaining flyslag particles from said gas stream, producing a partially purified gas stream substantially free of flyslag and a loaded aqueous scrubbing solution containing ammonium thiocyanate;
(d) hydrolyzing ammonium thiocyanate in at least a portion of said loaded scrubbing solution, forming a hydrolyzed solution;
(e) stripping $H_2S$, $NH_3$, and $CO_2$ from at least a portion of said hydrolyzed solution in a stripping zone;
(f) removing an aqueous stream of stripped solution containing flyslag particles from said stripping zone, and passing said aqueous stream to a concentrating zone;
(g) removing from said concentrating zone a concentrated aqueous stream derived from said aqueous stream and having a ratio of flyslag particulate solids to liquid greater than that of the aqueous stream entering said concentrating zone; and
(h) mixing a major portion of flyslag derived from at least one gasification reactor of step (a) and a minor portion of cementitious material with at least a portion of the concentrated stream from step (g), the concentrated aqueous stream being supplied in a ratio of from about one part to about five parts concentrated aqueous stream per part, by weight, combined total solids of flyslag and cementitious material, and producing a solid flyslag composite having improved disposal properties.

* * * * *